United States Patent
Kizu et al.

(10) Patent No.: US 9,951,284 B2
(45) Date of Patent: Apr. 24, 2018

(54) GASIFIER COOLING STRUCTURE, GASIFIER, AND GASIFIER ANNULUS PORTION ENLARGEMENT METHOD

(71) Applicant: MITSUBISHI HITACHI POWER SYSTEMS, LTD., Yokohama (JP)

(72) Inventors: Tetsuya Kizu, Tokyo (JP); Osamu Shinada, Tokyo (JP); Masashi Kitada, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 87 days.

(21) Appl. No.: 15/114,224

(22) PCT Filed: Dec. 24, 2014

(86) PCT No.: PCT/JP2014/084200
§ 371 (c)(1),
(2) Date: Jul. 26, 2016

(87) PCT Pub. No.: WO2015/115004
PCT Pub. Date: Aug. 6, 2015

(65) Prior Publication Data
US 2017/0009161 A1    Jan. 12, 2017

(30) Foreign Application Priority Data
Feb. 3, 2014   (JP) .................. 2014-018571

(51) Int. Cl.
*C10J 3/76* (2006.01)
*F22B 1/18* (2006.01)
*F28D 7/06* (2006.01)

(52) U.S. Cl.
CPC ......... *C10J 3/76* (2013.01); *C10J 2300/1884* (2013.01); *Y02E 20/18* (2013.01)

(58) Field of Classification Search
CPC ........ C10J 3/76; C10J 2300/1884; F22B 1/18; F22B 1/1846; F28D 7/0041; F28D 7/06; F28F 9/22; F28F 13/06; F28F 19/00
See application file for complete search history.

(56) References Cited

U.S. PATENT DOCUMENTS 4,739,729 A * 4/1988 Rettemeier ............. F22B 33/18
                                                    122/476
5,230,717 A * 7/1993 Ogawa ..................... C10J 3/485
                                                    122/7 R
(Continued)

FOREIGN PATENT DOCUMENTS

JP          61-243895          10/1986
JP          5-71602            9/1993
(Continued)

OTHER PUBLICATIONS

International Search Report dated Mar. 10, 2015 in corresponding International Application No. PCT/JP2014/084200.
(Continued)

*Primary Examiner* — Matthew J Merkling
(74) *Attorney, Agent, or Firm* — Wenderoth, Lind & Ponack, L.L.P.

(57) ABSTRACT

Provided is a gasifier cooling structure allowing the complexity of the furnace wall structure to be reduced to a minimum, allowing the configurability of headers and connecting pipes to be improved while maintaining as much as possible the ability to cool raw syngas. In the gasifier cooling structure, the raw syngas from a gasified carbonaceous solid fuel flows through the interior of a furnace wall formed inside a pressure vessel having a circular cross section, and the raw syngas is cooled by heat exchange with a fluid flowing inside a heat exchanger tube from a heat exchanger, whereof a plurality is provided within the furnace wall. The furnace wall has a polygonal structure (Continued)

wherein mutually orthogonal faces are linked by an oblique face in between, and whereof the cross sectional shape is such that the edge of the oblique face is shorter than the edges of the mutually orthogonal faces.

4 Claims, 6 Drawing Sheets

(56) References Cited

U.S. PATENT DOCUMENTS

| | | | | |
|---|---|---|---|---|
| 5,247,907 | A | * 9/1993 | Lee | C01B 3/38 122/1 R |
| 8,511,258 | B2 | * 8/2013 | Yamamoto | F22B 21/00 110/204 |
| 2007/0144712 | A1 | 6/2007 | Koyama et al. | |
| 2014/0345198 | A1 | 11/2014 | Haari et al. | |

FOREIGN PATENT DOCUMENTS

| | | |
|---|---|---|
| JP | 2006-214712 | 8/2006 |
| JP | 2007-218458 | 8/2007 |
| JP | 2008-145061 | 6/2008 |
| JP | 2009-198065 | 9/2009 |
| JP | 2013-221068 | 10/2013 |
| WO | 2013/118626 | 8/2013 |

OTHER PUBLICATIONS

Notification of Reasons for Rejection dated Mar. 11, 2014 in corresponding Japanese Application No. 2014-018571 (with English translation).

Decision to Grant a Patent dated Jun. 3, 2014 in corresponding Japanese Application No. 2014-018571.

* cited by examiner

ONE SIDE REDUCTION RATIO(%)=(La−Lb)/La×100

|  |  | BASE | CASE A | CASE B | CASE C | CASE D | CASE E | CASE F |
|---|---|---|---|---|---|---|---|---|
| ONE SIDE REDUCTION RATIO | % | 0.0 | 11.1 | 18.5 | 25.9 | 33.3 | 40.7 | 48.1 |
| COST REDUCTION RATIO | % | 0.0 | −5.5 | −7.2 | −6.9 | −3.3 | 1.2 | 6.8 |

GASIFIER COOLING STRUCTURE, GASIFIER, AND GASIFIER ANNULUS PORTION ENLARGEMENT METHOD

TECHNICAL FIELD

The present invention relates to a gasifier cooling structure for cooling raw syngas in a gasifier which gasifies carbonaceous solid fuel, a gasifier, and a method of enlarging an annulus portion of a gasifier.

BACKGROUND ART

A gasifier which gasifies carbonaceous solid fuel such as coal under a pressurized environment needs to be disposed in a pressure vessel. Such a gasifier is provided with a heat exchanger installed downstream of the gasifier in order to lower the temperature of gas which is generated in the gasifier to a heatproof temperature of a general steel pipe.

The heat exchanger is formed by a heat exchanger tube which is referred to as a Syn Gas Cooler (SGC), is an assembly (a heat exchanger tube group) of a furnace wall (a SGC peripheral wall) and the heat exchanger tubes (SGCs) installed inside, and is configured such that in a furnace wall inside downstream part of the gasifier, a fluid such as water flowing inside the heat exchanger tube absorbs heat from high-temperature raw syngas flowing inside of the furnace wall, thereby lowering a gas temperature.

The heat exchanger tube group of the heat exchanger has an element structure, and one element assembly is referred to as a bank. Further, the banks are classified to have several kinds of specification according to a temperature zone of a fluid (water, steam, or the like) flowing through the heat exchanger tube. The heat exchanger tube group configuring an element is assembled into a bank by being connected to a steel pipe which is referred to as a header, in a space which is referred to as an annulus portion which is formed between the outer peripheral surface of the furnace wall and the inner peripheral surface of a pressure vessel.

Further, respective banks having different specifications are connected to the outside of the gasifier by connecting the respective headers by a steel pipe which is referred to as a connecting pipe and finally making the steel pipe go through the pressure vessel.

Further, the heat exchanger which is installed in the gasifier generally has a structure in which a bank is disposed in a furnace wall having, for example, a rectangular cross-section. However, for example, as disclosed in the following PTL 1, there is also a structure in which a bank is disposed in a hexagonal flue.

CITATION LIST

Patent Literature

[PTL 1] Japanese Unexamined Patent Application Publication No. 2008-145061
[PTL 2] Japanese Unexamined Utility Model Registration Application Publication No. 5-71602

SUMMARY OF INVENTION

Technical Problem

Incidentally, it is desirable that the pressure vessel has a circular cross-sectional shape in order to maintain a pressure. However, it is preferable that the cross-sectional shape of the furnace wall (the SGC peripheral wall) described above is a regular tetragon from the viewpoint of disposition/minimum cost, because the element of the heat exchanger is disposed inside. Further, the cross-sectional shape of each of the pressure vessel and the furnace wall refers to a cross-sectional shape orthogonal to a flow direction of the raw syngas, and therefore, the cross-sectional shape in a case where the raw syngas flows in a vertical direction is the shape of a horizontal cross-section.

Further, the header and the connecting pipe need to be disposed in the annulus portion. However, in the annulus portion, a gap (a space width) which is formed between the pressure vessel having a circular cross-section and a corner portion of the furnace wall having a square cross-section becomes narrowest. The existence of such a minimum gap becomes a restriction limiting securing a space for disposing the header and the connecting pipe in the annulus portion.

In general, in pressure vessels having the same pressure resistance performance, the smaller the diameter, the shorter the peripheral length becomes, and therefore, a low-weight vessel having a thin wall thickness is made. However, in the gasifier, there is a restriction on the disposition of the header and the connecting pipe described above, and therefore, there is a situation in which the annulus portion cannot be made to be sufficiently small. That is, in the gasifier, it is necessary to secure a space for the disposition of the header and the connecting pipe in the annulus portion, and therefore, in particular, there is a problem in that it is not possible to optimize the diameter of the pressure vessel in order to secure a minimum gap enabling the disposition of the header and the connecting pipe.

Further, in order to make the annulus portion as small as possible, a structure in which the furnace wall cross-sectional shape is a polygonal shape close to a circular shape is used in mitigation. However, in PTL 1 above, for example, the headers are disposed at three locations, and thus the furnace wall structure and the structures of the element, the header, and the connecting pipe become complicated, thereby causing an increase in manufacturing cost, and thus this is unfavorable.

From such a background, in the gasifier, a gasifier cooling structure which minimizes a decrease in performance of cooling gas generated in the gasifier, minimizes even the complexity of the furnace wall structure, thereby improving the configurability of the header and the connecting pipe, and enables the optimization of the shape of the pressure vessel, a gasifier, and a method of enlarging the annulus portion of the gasifier are desired.

The present invention has been made in order to solve the above problem and an object thereof is to provide a gasifier cooling structure in which it is possible to minimize the complexity of a furnace wall structure and improve the configurability of a header and a connecting pipe while maintaining the performance of cooling raw syngas as much as possible and the optimization of the shape of a pressure vessel can also be realized, and a method of enlarging an annulus portion of a gasifier.

Solution to Problem

The present invention adopts the following means in order to solve the above problem.

According to a first aspect of the present invention, there is provided a gasifier cooling structure for cooling raw syngas which is generated by gasifying carbonaceous solid fuel and flows inside of a furnace wall formed in a pressure vessel having a circular cross-section, by heat exchange with a fluid flowing through tubes of a plurality of heat exchanger tube groups installed inside the furnace wall, wherein the furnace wall has a polygonal structure in which faces orthogonal to each other are connected by an oblique face, and has a cross-sectional shape in which a side of the oblique face is shorter than the respective sides of the faces orthogonal to each other, and the oblique face is provided such that a "one side reduction ratio" which is defined by a formula, "$(La-Lb)/La \times 100$", when a length of a side before corner portions of a square cross-sectional shape are cut is set to be La and a length after the corner portions are cut is set to be Lb, is within a range of 11.1% to 33.3%, and the length La of the side is within a range of 2 m to 5 m.

According to the above aspect, the furnace wall formed in the pressure vessel having a circular cross-section has a polygonal structure in which faces orthogonal to each other are connected by an oblique face, and has a cross-sectional shape in which a side of the oblique face is shorter than the respective sides of the faces orthogonal to each other, and the oblique face is provided such that a "one side reduction ratio" which is defined by a formula, "$(La-Lb)/La \times 100$", when a length of a side before corner portions of a square cross-sectional shape are cut is set to be La and a length after the corner portions are cut is set to be Lb, is within a range of 11.1% to 33.3%, and the length La of the side is within a range of 2 m to 5 m. In other words, a shape in which rectangular cross-section corner portions are cut so as to be chamfered is made. Therefore, the annulus portion can be enlarged without complicating the furnace wall structure. Such enlargement of the annulus portion is effective in achieving both the optimization of the shape of the pressure vessel and improvement in the configurability of the header and the connecting pipe.

In the above aspect, it is preferable that a connecting pipe connecting a header of the heat exchanger tube group and the heat exchanger tube group is disposed in an annulus portion which is a space which is formed between the pressure vessel and the furnace wall and a change in direction of approximately 90 degrees when viewed in a planar view, of the connecting pipe, is effected in a region of the oblique face, and in this way, it becomes possible to make the diameter of the pressure vessel small.

Further, according to a second aspect of the present invention, there is provided a gasifier including: a syngas cooler having the gasifier cooling structure according to the above aspect; and a gas production section for gasifying the carbonaceous solid fuel, which is provided on the upstream side of the syngas cooler.

According to a third aspect of the present invention, there is provided a method of enlarging an annulus portion of a gasifier in which raw syngas which is generated by gasifying carbonaceous solid fuel flows inside of a furnace wall formed in a pressure vessel having a circular cross-section and is cooled by heat exchange with a fluid flowing through tubes of a plurality of heat exchanger tube groups installed inside the furnace wall, and a connecting pipe connecting a header of the heat exchanger tube group and the heat exchanger tube group is disposed in an annulus portion which is a space which is formed between the pressure vessel and the furnace wall, wherein the furnace wall has a polygonal structure in which faces orthogonal to each other are connected by an oblique face, and has a cross-sectional shape in which a side of the oblique face is shorter than the respective sides of the faces orthogonal to each other, and the oblique face is provided such that a "one side reduction ratio" which is defined by a formula, "$(La-Lb)/La \times 100$", when a length of a side before corner portions of a square cross-sectional shape are cut is set to be La and a length after the corner portions are cut is set to be Lb, is within a range of 11.1% to 33.3%, and the length La of the side is within a range of 2 m to 5 m.

According to the above aspect, the furnace wall formed in the pressure vessel having a circular cross-section has a polygonal structure in which faces orthogonal to each other are connected by an oblique face, and has a cross-sectional shape in which a side of the oblique face is shorter than the respective sides of the faces orthogonal to each other, and the oblique face is provided such that a "one side reduction ratio" which is defined by a formula, "$(La-Lb)/La \times 100$", when a length of a side before corner portions of a square cross-sectional shape are cut is set to be La and a length after the corner portions are cut is set to be Lb, is within a range of 11.1% to 33.3%, and the length La of the side is within a range of 2 m to 5 m. In other words, a cross-sectional shape in which the rectangular cross-section corner portions of the furnace wall are cut so as to be chamfered is made. Therefore, the annulus portion can be easily enlarged without complicating the furnace wall structure. Such enlargement of the annulus portion is a method which is effective in achieving both the optimization of the shape of the pressure vessel and improvement in the configurability of the header and the connecting pipe.

Advantageous Effects of Invention

According to the present invention described above, due to the polygonal cross-section structure in which the oblique faces are provided by cutting so as to chamfer only the rectangular cross-section corner portions of the furnace wall, it is possible to reduce the annulus portion of the gasifier to a minimum and improve the configurability of the header and the connecting pipe. As a result, it becomes possible to optimize the shape of the pressure vessel. Further, only the rectangular cross-section corner portions of the furnace wall are cut so as to be chamfered, and therefore, it is possible to minimize an increase in the number of working steps required for the fabrication of the furnace wall, or a reduction in the size of a heat-transfer surface. Therefore, it is possible to optimize the shape of the pressure vessel while substantially maintaining the performance of cooling gas generated in the gasifier, and it is possible to achieve both securing sufficient performance when cooling the raw syngas in the gasifier and a reduction in manufacturing cost.

BRIEF DESCRIPTION OF DRAWINGS

FIG. 6 is a cross-sectional view showing a pressure vessel internal structure of a gasifier in which a heat exchanger for cooling generated gas is disposed, wherein

DESCRIPTION OF EMBODIMENTS

Hereinafter, with respect to a gasifier cooling structure, a gasifier, and a method of enlarging an annulus portion of a gasifier according to the present invention, an embodiment thereof will be described based on the drawings.

A gasifier is for gasifying carbonaceous solid fuel such as coal under a pressurized environment and then supplying raw syngas lowered in temperature by being cooled to a heatproof temperature of a general steel pipe, to the outside of a furnace, and in the following description, coal is gasified, however, there is no particular limitation. Further, as carbonaceous solid fuel other than coal, in addition to petroleum coke, biomass fuel such as timber form forest thinning, waste wood, driftwood, grasses, waste, sludge, or a tire can be exemplified.

Figure 6A:
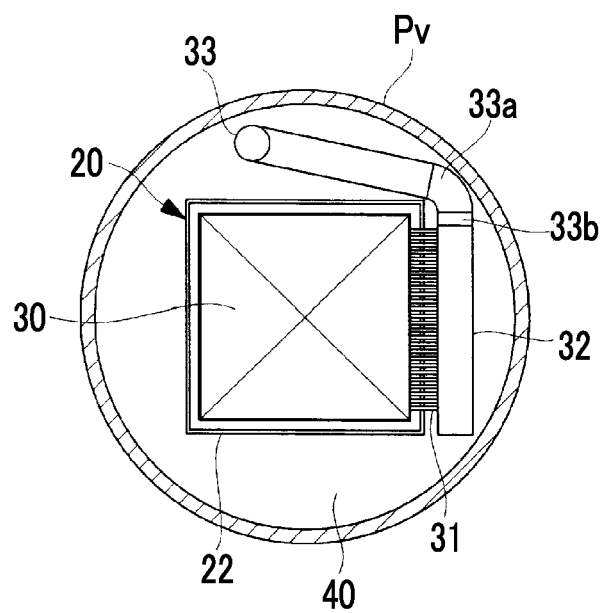
FIG. 6(a) is a horizontal sectional view (an A-A line cross-sectional view of FIG. 6(b)) and FIG. 6(b) is a longitudinal sectional view.
Figure 6B:
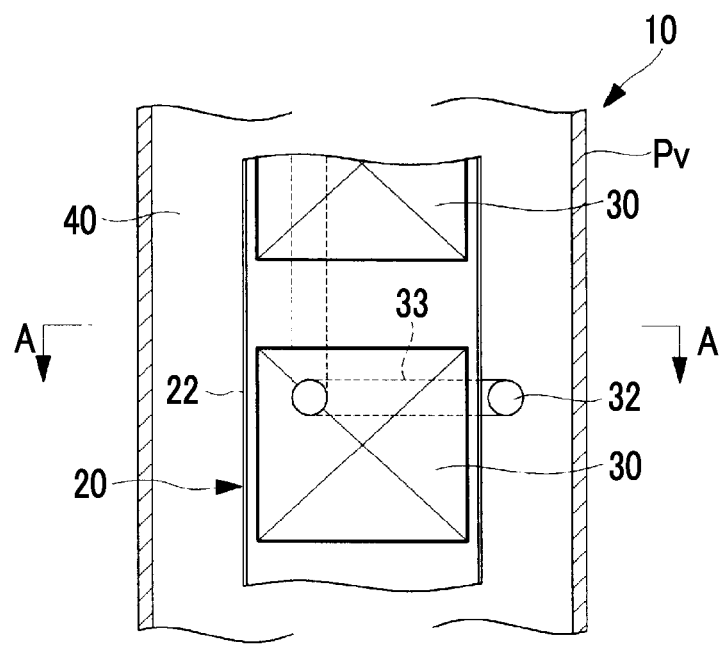
Figure 7:
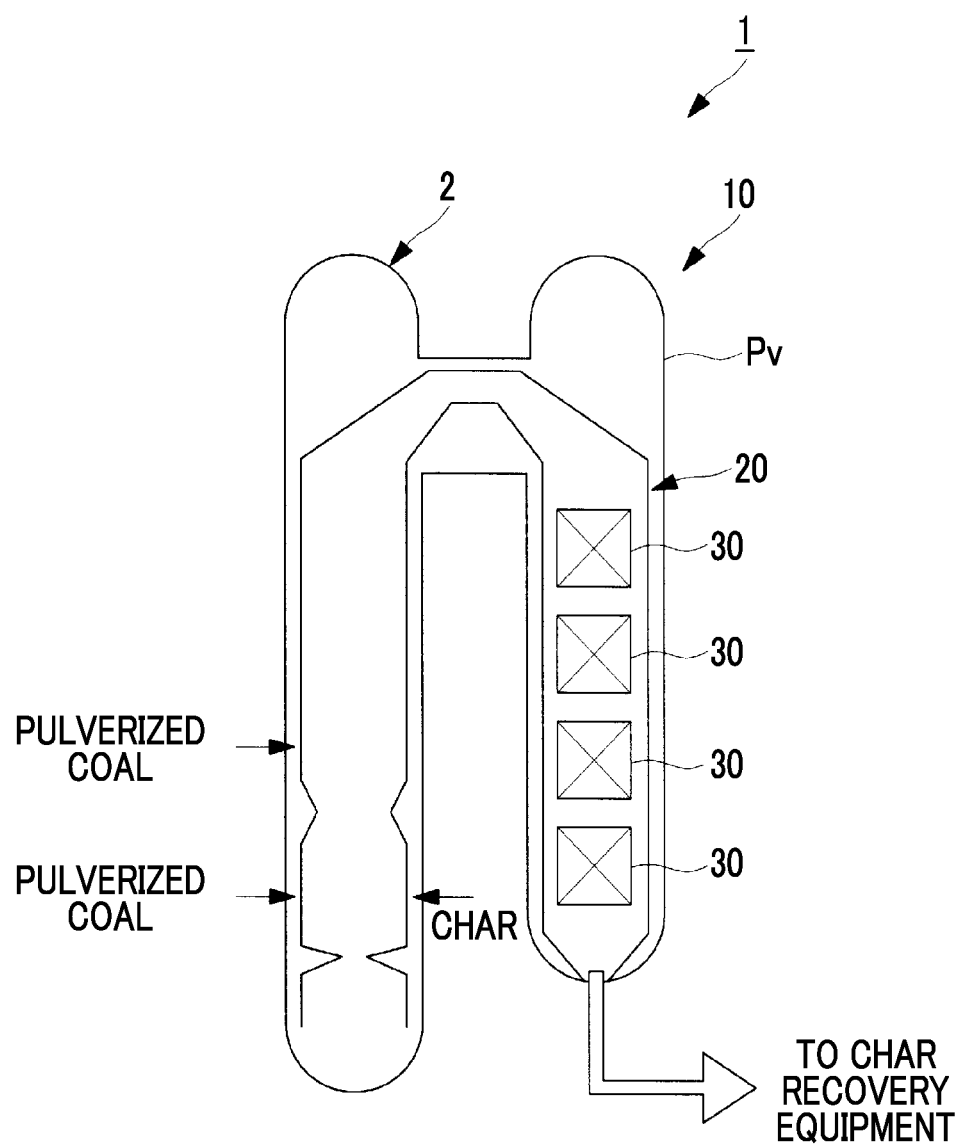
FIG. 7 is a longitudinal sectional view showing an example of a schematic configuration of a gasifier.

A gasifier 1 shown in FIGS. 6 and 7 is a coal (pulverized coal) gasifier which is used in, for example, an integrated coal gasification combined cycle power generation system (IGCC), and includes a gas production section 2 and a syngas cooler 10 as main constituent elements.

Raw syngas which is obtained by gasifying pulverized coal in the gas production section 2 of the gasifier 1 is led to the syngas cooler 10 provided on the downstream side of the gas production section 2 and is cooled by passing through a plurality of heat exchangers 30 configuring the syngas cooler 10. The raw syngas cooled in the syngas cooler 10 is subjected to necessary refining treatment which is applied by various devices (not shown) provided outside the gasifier 1, and then becomes fuel gas for an operation of a gas turbine.

Now, for example, the raw syngas having a temperature of about 1000° C. and containing char is supplied from the gas production section 2 of the gasifier 1 to the syngas cooler 10 shown in the drawing. For this reason, the syngas cooler 10 has a function of cooling the raw syngas to a temperature suitable for gasifier downstream-side equipment (a steel pipe or the like for use in various types of equipment or piping), and recovering heat energy in the raw syngas.

Further, the syngas cooler 10 has a configuration in which the plurality of heat exchangers 30 are disposed in a flue 20 which is formed in a pressure vessel Pv having a circular cross-section and serves as a raw syngas flow path.

With respect to the syngas cooler 10 which is configured with the plurality of heat exchangers 30, the raw syngas flows through the flue 20, thereby being sequentially subjected to heat exchange. For this reason, the temperature of the raw syngas is sequentially lowered as it goes from the upstream side to the downstream side, and therefore, the plurality of heat exchangers 30 respectively have different temperature specifications or the like.

Further, in FIG. 6, reference numeral 22 in the drawing denotes a furnace wall of the flue 20, reference numeral 31 denotes a heat exchanger tube configuring the heat exchanger 30, reference numeral 32 denotes a header which connects the heat exchanger tubes 31, reference numeral 33 denotes a connecting pipe which connects the headers 32, and reference numeral 40 denotes a space which is referred to as an annulus portion which is formed between the inner surface of the pressure vessel Pv and the outer surface of the furnace wall 22.

Figure 1:
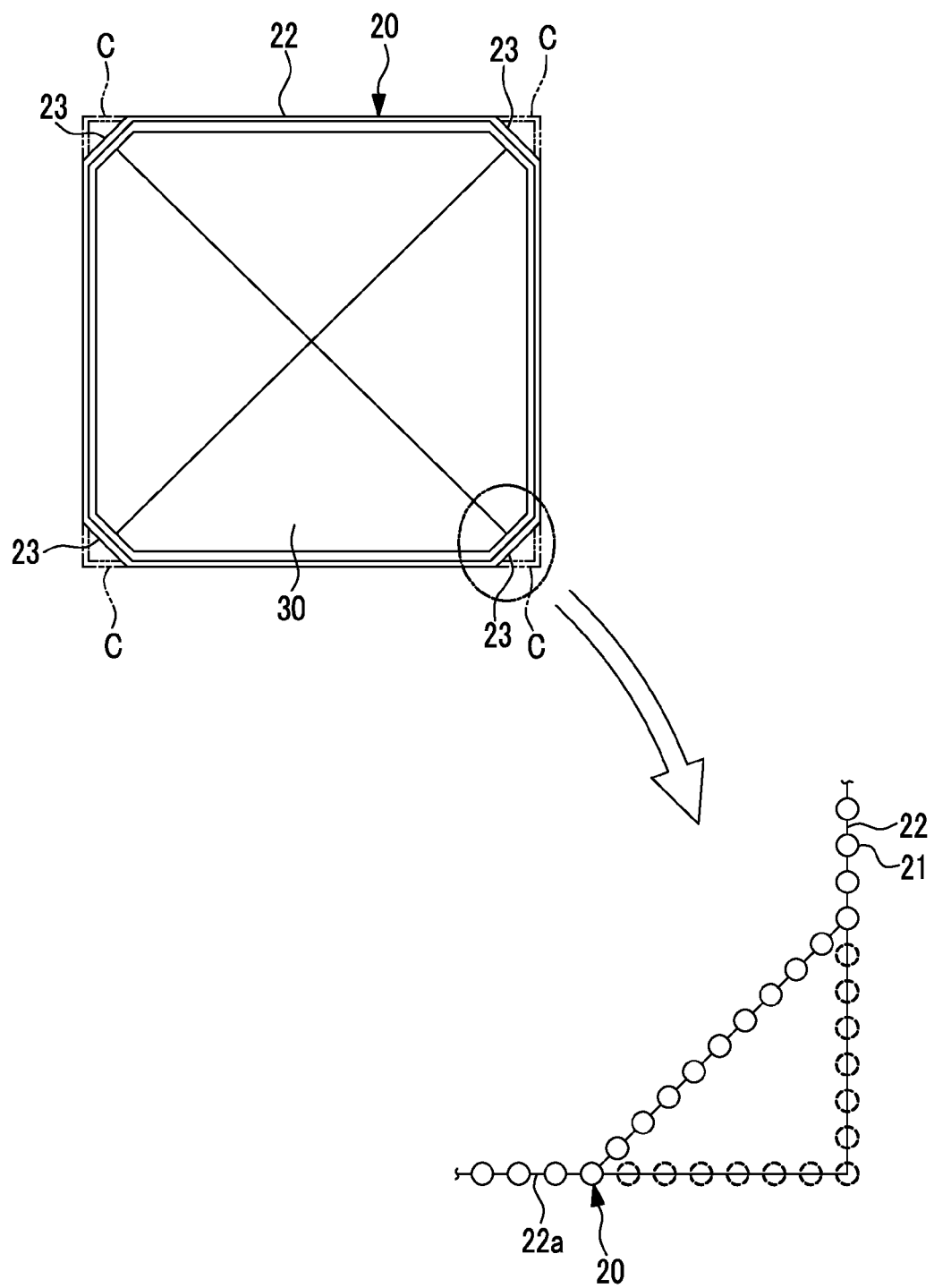
FIG. 1 is a horizontal sectional view showing an embodiment of a gasifier cooling structure and a method of enlarging an annulus portion of a gasifier according to the present invention.

The flue 20 of this embodiment is, for example, a gas flow path in which four sides of a square cross-section (rectangular cross-section) are surrounded by the furnace wall (SGC peripheral wall) 22 having a wall surface structure formed by using a large number of heat exchanger tubes 21, each of which is referred to as an SGC, as shown in FIG. 1. Further, in the furnace wall 22 of the flue 20, the heat exchanger tubes 21 adjacent to each other are connected by a fin 22a, thereby forming a wall surface, and a wall surface temperature is managed by making a fluid such as water flow through the heat exchanger tubes 21.

Further, the heat exchanger 30 is also referred to as a bank and is a heat exchanger tube assembly (a heat exchanger tube group) of an element structure which is configured with the heat exchanger tubes 31, each of which is referred to as the same SGC as in the furnace wall 22. In the heat exchanger 30, the fluid such as water flowing through the heat exchanger tubes 31 absorbs heat from high-temperature raw syngas flowing inside of the furnace wall 22, thereby lowering a gas temperature of the raw syngas. Further, the heat energy in the raw syngas can be recovered by effectively utilizing the heat that the fluid has absorbed from the raw syngas.

In the heat exchanger 30 described above, the large number of heat exchanger tubes 31 are connected to the header 32 outside of the furnace wall 22. Further, the headers 32 of the respective heat exchangers 30 are connected by the connecting pipe 33, and the connecting pipe 33 is connected to the outside of the syngas cooler 10.

Therefore, the header 32 and the connecting pipe 33 described above are disposed in the annulus portion 40 that is a space which is formed between the inner surface of the pressure vessel Pv and the outer surface of the furnace wall 22.

That is, the syngas cooler 10 of this embodiment has a gasifier cooling structure in which the high-temperature raw syngas flows through the flue 20 which is formed by being surrounded by the furnace wall 22 in the pressure vessel Pv having a circular cross-section and the raw syngas is cooled by heat exchange with the fluid which flows through the heat exchanger tubes 31 of the plurality of heat exchangers 30 installed in the furnace wall 22.

In such a gasifier cooling structure, in this embodiment, the cross-sectional shape of the furnace wall 22 has a shape in which rectangular cross-section corner portions of a square are cut so as to be chamfered, that is, a polygonal cross-sectional shape obtained by providing oblique faces 23 in rectangular cross-section corner portions C. Specifically, a structure is made in which four corner portions C shown by an imaginary line in FIG. 1 are removed and the furnace walls 22 adjacent to each other are connected by the oblique face 23 shown by a solid line. Further, the oblique face 23 also has a furnace wall structure using the plurality of heat exchanger tubes 21, similar to the furnace wall 22.

An octagon shape is formed in which the sides of the oblique faces 23 described above are considerably shorter than other faces. In other words, the flue 20 having a square cross-section is made so as to have a cross-sectional shape in which the corner portions C are chamfered, and therefore, it becomes possible to minimize the number of heat exchanger tubes 31 having different lengths which are disadvantageous in terms of cost due to complexity of manufacturing work, an increase in the number of parts, or the like.

As a result, the space of the annulus portion 40 can be enlarged by an amount corresponding to the removal of the corner portions C without complicating the furnace wall structure, as in a polygonal cross-sectional shape, and therefore, the configurability of the header 32 or the connecting pipe 33 is improved. That is, due to such enlargement of the annulus portion 40, a restriction on a piping route of the header 32 or the connecting pipe 33 can be reduced even without enlarging the cross-sectional shape of the pressure vessel Pv, and therefore, both the optimization of the cross-sectional shape of the pressure vessel Pv and improvement in the configurability of the header 32 and the connecting pipe 33 can be achieved, and therefore, it is effective.

The present invention is not limited to the above-described embodiment and is not necessarily limited to a polygon according to the arrangement of the connecting pipe. Various modifications and changes can be made within a scope which does not depart from the gist of the present invention, such as chamfering corner portions of a square, for example.

Figures 2, 3:
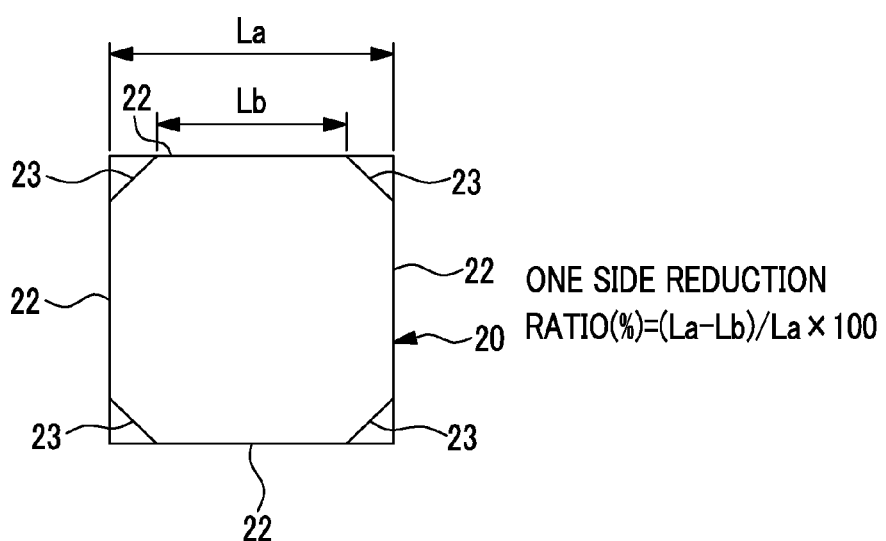
FIG. 2 is an explanatory diagram showing the definition of a one side reduction ratio (%).
FIG. 3 is a table showing trial calculation results regarding the one side reduction ratio.

Incidentally, with respect to the cutting of the corner portions C described above, it is desirable that a one side reduction ratio (%) shown in FIG. 2 is set as follows.

The one side reduction ratio shown in FIG. 2 is defined by the following mathematical formula when, with respect to the furnace wall 22 of the flue 20 having a square cross-sectional shape, the length of a side before the corner portions C are cut is set to be La and the length of a side after the corner portions C are cut is set to be Lb.

One side reduction ratio (%)=$(La-Lb)/La \times 100$

The length La of a side before the corner portions C are cut is set to be in a range of 2 m to 5 m and design dimensions and a pitch shall be determined by a design value.

Figure 4:
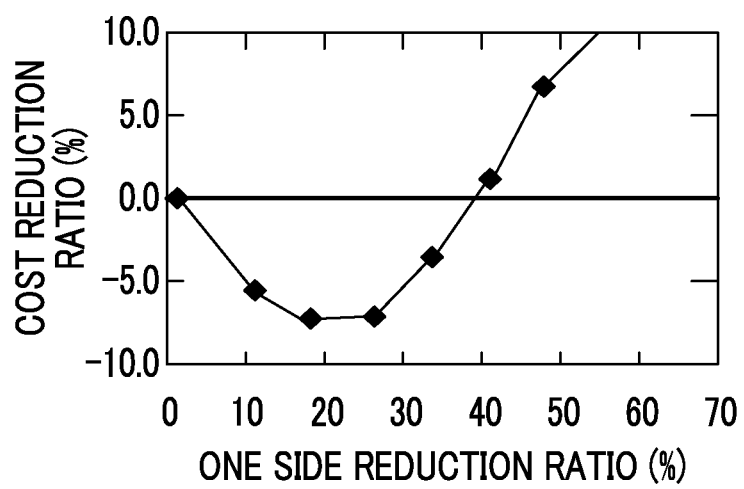
FIG. 4 is a diagram showing the trial calculation results of the one side reduction ratio in a graph form.

It is desirable that the one side reduction ratio described above is set within the following range from the trial calculation results shown in FIGS. 3 and 4. Further, in the following description, a cost reduction ratio means a reduction ratio of the number of steps and material weight required for manufacturing of the pressure vessel and the heat exchanger.

The one side reduction ratio in which a cost reduction is effectively possible is within a range of 11.1% to 33.3%, as in Case A to Case D shown in FIG. 3. Further, a more preferable range is a range of 14.0% to 28.0%.

Further, a heat-transfer area reduction ratio in which a cost reduction is possible is within a range of 0.0% to 10.0%. A more preferable range is a range of 1.0% to 8.0% corresponding to about 80% of the reduction-able range, and the most preferable range is a range of 2.0% to 5.5% corresponding to about 30% of the reduction-able range.

Further, the maximum/minimum ratio of an annulus width in which a cost reduction is possible is within a range of 1.35 to 1.95. A more preferable range is a range of 1.40 to 1.90 corresponding to about 80% of the reduction-able range, and the most preferable range is a range of 1.50 to 1.70 corresponding to about 30% of the reduction-able range.

In this manner, in this embodiment, the cross-sectional shape of the furnace wall 22 is made to be a shape in which the rectangular cross-section corner portions C of a square are cut so as to be chamfered, and therefore, the annulus portion 40 can be enlarged without complicating the furnace wall structure. Such enlargement of the annulus portion 40 is a method of enlarging the annulus portion of the gasifier 1, which is effective in achieving both the optimization of the shape of the pressure vessel Pv and improvement in the configurability of the header 32 and the connecting pipe 33.

That is, only the rectangular cross-section corner portions C of the furnace wall 22 are cut, whereby it is possible to reduce the annulus portion 40 of the gasifier to a minimum and improve the configurability of the header 32 and the connecting pipe 33, and as a result, it is possible to optimize the shape of the pressure vessel Pv and attain a reduction in the diameter of the pressure vessel Pv.

Further, only the rectangular cross-section corner portions C of the furnace wall 22 are cut so as to be chamfered, and therefore, it is possible to minimize an increase in the number of working steps required for the fabrication of the furnace wall 22, or a reduction in the size of the heat-transfer surface of the heat exchanger 30.

In the following, a reduction in the diameter of the pressure vessel Pv described above will be specifically described based on a comparison diagram of FIG. 5.

Figure 5:
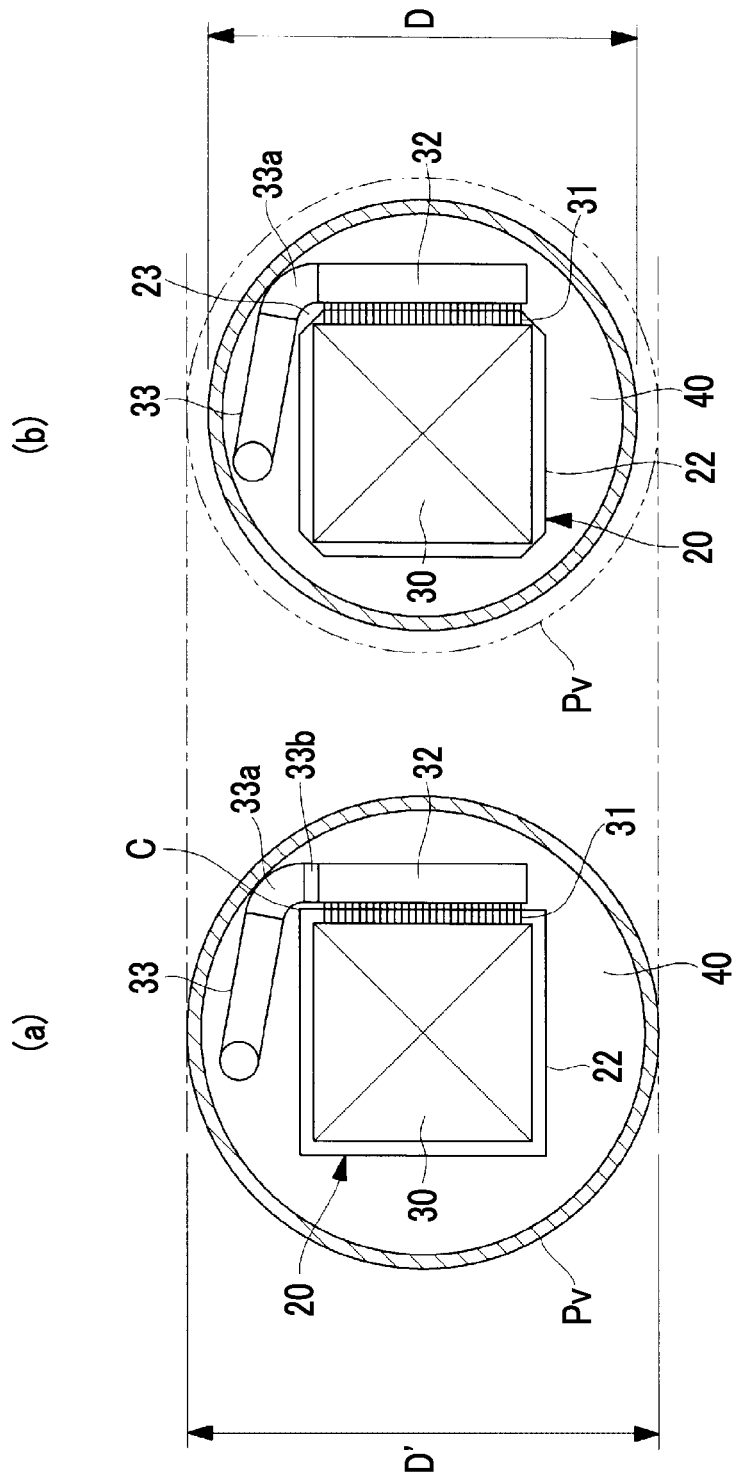
FIG. 5 is a comparison diagram showing the effect of reducing a pressure vessel diameter by the present invention, wherein (a) is a case where corner portions of a furnace wall are not chamfered and (b) is a case where oblique faces are provided by chamfering the corner portions of the furnace wall by applying the present invention.

As shown in FIG. 5, it is desirable that the connecting pipe 33 connecting the header 32 and another heat exchanger performs a change in direction of approximately 90 degrees when viewed in a planar view, in the annulus portion 40. For this reason, in the flue 20 of (a) in which the oblique face 23 is not provided in the furnace wall 22, a straight pipe section 33b is required between a bend section 33a of the connecting pipe 33 and the header 32 in order to perform a change in direction to avoid the corner portion C. That is, the straight pipe section 33b avoids interference between the connecting pipe 33 and the corner portion C by making a bend center of the bend section 33a be substantially located on an extended line of a diagonal line of the flue 20 by moving a bend starting point of the bend section 33a in a direction of the corner portion C. Further, the diameter of the pressure vessel Pv in this case is D'.

In contrast, if a change in direction of approximately 90 degrees when viewed in a planar view, of the connecting pipe 33, is made so as to be effected in the region of the oblique face 23, in the flue 20 of (b) in which the oblique face 23 is provided in the furnace wall 22, the straight pipe section 33b for performing a change in direction to avoid the corner portion C is not required between the bend section 33a of the connecting pipe 33 and the header 32. That is, if the oblique face is formed by cutting so as to chamfer the corner portion C, the bend starting point and a bend end point of the bend section 33a are located within the range of the oblique face 23 and the bend center of the bend section 33a can be substantially located on an extended line of a diagonal line of the flue 20 even if the straight pipe section 33b is not provided.

In this manner, if the straight pipe section 33b is not required, even in the annulus portion 40 in which a diameter D of the pressure vessel Pv is made to be smaller than D', the connecting pipe 33 can perform a change in direction of approximately 90 degrees when viewed in a planar view, while having the same curvature, and the connecting pipe 33 does not interfere with the furnace wall 22 of the flue 20. Such a reduction in the diameter of the pressure vessel Pv provides many advantages such as a reduction in size and weight becoming possible.

Therefore, it is possible to optimize the shape of the pressure vessel Pv while substantially maintaining the performance of cooling gas generated in the gasifier 1, and it is possible to achieve both securing sufficient performance when cooling the raw syngas in the gasifier 1 and a reduction in manufacturing cost.

In addition, the present invention is not limited to the above-described embodiment and can be appropriately modified within a scope which does not depart from the gist thereof.

REFERENCE SIGNS LIST

1: gasifier
2: gas production section

10: syngas cooler
20: flue
21, 31: heat exchanger tube (SGC)
22: furnace wall (SGC peripheral wall)
23: oblique face
30: heat exchanger (heat exchanger tube group)
32: header
33: connecting pipe
33a: bend section
33b: straight pipe section
40: annulus portion
C: corner portion

The invention claimed is:

1. A gasifier cooling structure for cooling raw syngas which is generated by gasifying carbonaceous solid fuel and flows inside of a furnace wall formed in a pressure vessel having a circular cross-section, by heat exchange with a fluid flowing through tubes of a plurality of heat exchanger tube groups installed inside the furnace wall,
wherein the furnace wall has a polygonal structure in which faces orthogonal to each other are connected by an oblique face, and has a cross-sectional shape in which a side of the oblique face is shorter than the respective sides of the faces orthogonal to each other, and
the oblique face is provided such that a "one side reduction ratio" which is defined by a formula, "(La−Lb)/La×100", when a length of a side before corner portions of a square cross-sectional shape are cut is set to be La and a length after the corner portions are cut is set to be Lb, is within a range of 11.1% to 33.3%, and the length La of the side is within a range of 2 m to 5 m.

2. The gasifier cooling structure according to claim 1, wherein a connecting pipe connecting a header of the heat exchanger tube group and the heat exchanger tube group is disposed in an annulus portion which is a space which is formed between the pressure vessel and the furnace wall, and a change in direction of approximately 90 degrees when viewed in a planar view, of the connecting pipe, is effected in a region of the oblique face.

3. A gasifier comprising:
a syngas cooler having the gasifier cooling structure according to claim 1; and
a gas production section for gasifying the carbonaceous solid fuel, which is provided on the upstream side of the syngas cooler.

4. A method of enlarging an annulus portion of a gasifier in which raw syngas which is generated by gasifying carbonaceous solid fuel flows inside of a furnace wall formed in a pressure vessel having a circular cross-section and is cooled by heat exchange with a fluid flowing through tubes of a plurality of heat exchanger tube groups installed inside the furnace wall, and a connecting pipe connecting a header of the heat exchanger tube group and the heat exchanger tube group is disposed in an annulus portion which is a space which is formed between the pressure vessel and the furnace wall,
wherein the furnace wall has a polygonal structure in which faces orthogonal to each other are connected by an oblique face, and has a cross-sectional shape in which a side of the oblique face is shorter than the respective sides of the faces orthogonal to each other, and
the oblique face is provided such that a "one side reduction ratio" which is defined by a formula, "(La−Lb)/La×100", when a length of a side before corner portions of a square cross-sectional shape are cut is set to be La and a length after the corner portions are cut is set to be Lb, is within a range of 11.1% to 33.3%, and the length La of the side is within a range of 2 m to 5 m.

* * * * *